US008438655B2

(12) United States Patent
Iwakura

(10) Patent No.: US 8,438,655 B2
(45) Date of Patent: May 7, 2013

(54) SUBSTRATE PROCESSING SYSTEM

(75) Inventor: Hiroyuki Iwakura, Toyama (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 1214 days.

(21) Appl. No.: 12/224,808

(22) PCT Filed: Mar. 8, 2007

(86) PCT No.: PCT/JP2007/054544
§ 371 (c)(1),
(2), (4) Date: Sep. 24, 2008

(87) PCT Pub. No.: WO2007/102582
PCT Pub. Date: Sep. 13, 2007

(65) Prior Publication Data
US 2009/0292374 A1    Nov. 26, 2009

(30) Foreign Application Priority Data

Mar. 9, 2006  (JP) .................. 2006-064037

(51) Int. Cl.
*H04L 29/06*       (2006.01)

(52) U.S. Cl.
USPC ............................. 726/28; 713/167; 726/34

(58) Field of Classification Search ................ 713/167; 726/28, 34
See application file for complete search history.

(56) References Cited

U.S. PATENT DOCUMENTS

| 6,637,446 B2 * | 10/2003 | Frost et al. ................ 134/184 |
| 2002/0013908 A1 | 1/2002 | Nishihata et al. |
| 2003/0018910 A1 * | 1/2003 | Wert et al. ................ 713/200 |
| 2005/0108577 A1 | 5/2005 | Nishihata et al. |

FOREIGN PATENT DOCUMENTS

| JP | A-08-227835 | 9/1996 |
| JP | A-11-040469 | 2/1999 |
| JP | A-11-186365 | 7/1999 |
| JP | A-2000-343386 | 12/2000 |
| JP | A-2002-32274 | 1/2002 |
| JP | A-2002-050555 | 2/2002 |
| JP | A-2002-163016 | 6/2002 |
| JP | A-2003-059793 | 2/2003 |
| JP | A-2003-318075 | 11/2003 |
| JP | A-2006-60157 | 3/2006 |
| JP | 2006190182 A * | 7/2006 |
| JP | 2007041829 A * | 2/2007 |

OTHER PUBLICATIONS

Jun. 27, 2012 Office Action issued in Japanese Patent Application No. 2008-503911 (with translation).
Nov. 27, 2012 Japanese Office Action issued in Japanese Patent Application No. 2008-503911 (with translation).

(Continued)

*Primary Examiner* — Michael Pyzocha
(74) *Attorney, Agent, or Firm* — Oliff & Berridge, PLC

(57) ABSTRACT

A substrate processing system capable of making it easy to set an operation authority in a plurality of substrate processing apparatuses and a management device is provided. In a substrate processing system including a plurality of substrate processing apparatuses for executing a process on a wafer, a management device connected to the plurality of substrate processing apparatuses via a communication line, the management device has a display screen for setting an operation authority to each of the management device and the plurality of substrate processing apparatuses capable of communicating with the management device for each user.

9 Claims, 10 Drawing Sheets

OTHER PUBLICATIONS

Dec. 5, 2012 Written Opinion issued in Taiwanese Patent Application No. 096108108 (with translation).

Feb. 6, 2013 Office Action issued in Japanese Patent Application No. 2008-503911 (with translation).

* cited by examiner

FIG. 5

| No. | FUNCTION | DETAILS OF FUNCTION | USER PASSWORD | |
|---|---|---|---|---|
| | | | AAA | BBB |
| | | | OPERATION AUTHORITY IN MANAGEMENT DEVICE | OPERATION AUTHORITY IN OPERATION DEVICE |
| 1 | AGGREGATE INFORMATION MONITOR | | BROWSING ALLOWED | NO FUNCTION |
| 2 | DETAILED INFORMATION MONITOR | | BROWSING ALLOWED | BROWSING ALLOWED |
| 3 | TRACE DATA | | BROWSING ALLOWED | BROWSING ALLOWED |
| 4 | FAILURE INFORMATION | | BROWSING ALLOWED | BROWSING ALLOWED |
| 5 | RECIPE EDITING | | EDITING ALLOWED | EDITING ALLOWED |
| 6 | TABLE EDITING | ALARM CONDITION TABLE | BROWSING ALLOWED | BROWSING ALLOWED |
| 7 | | TEMPERATURE CORRECTION TABLE | BROWSING ALLOWED | BROWSING ALLOWED |
| 8 | REMOTE COMMAND | START | EXECUTION NOT ALLOWED | EXECUTION NOT ALLOWED |
| 9 | | STOP | EXECUTION ALLOWED | EXECUTION ALLOWED |
| 10 | | | | |
| 11 | | | | |

[DOWNLOAD] [UPLOAD] [SAVE] [CANCEL]

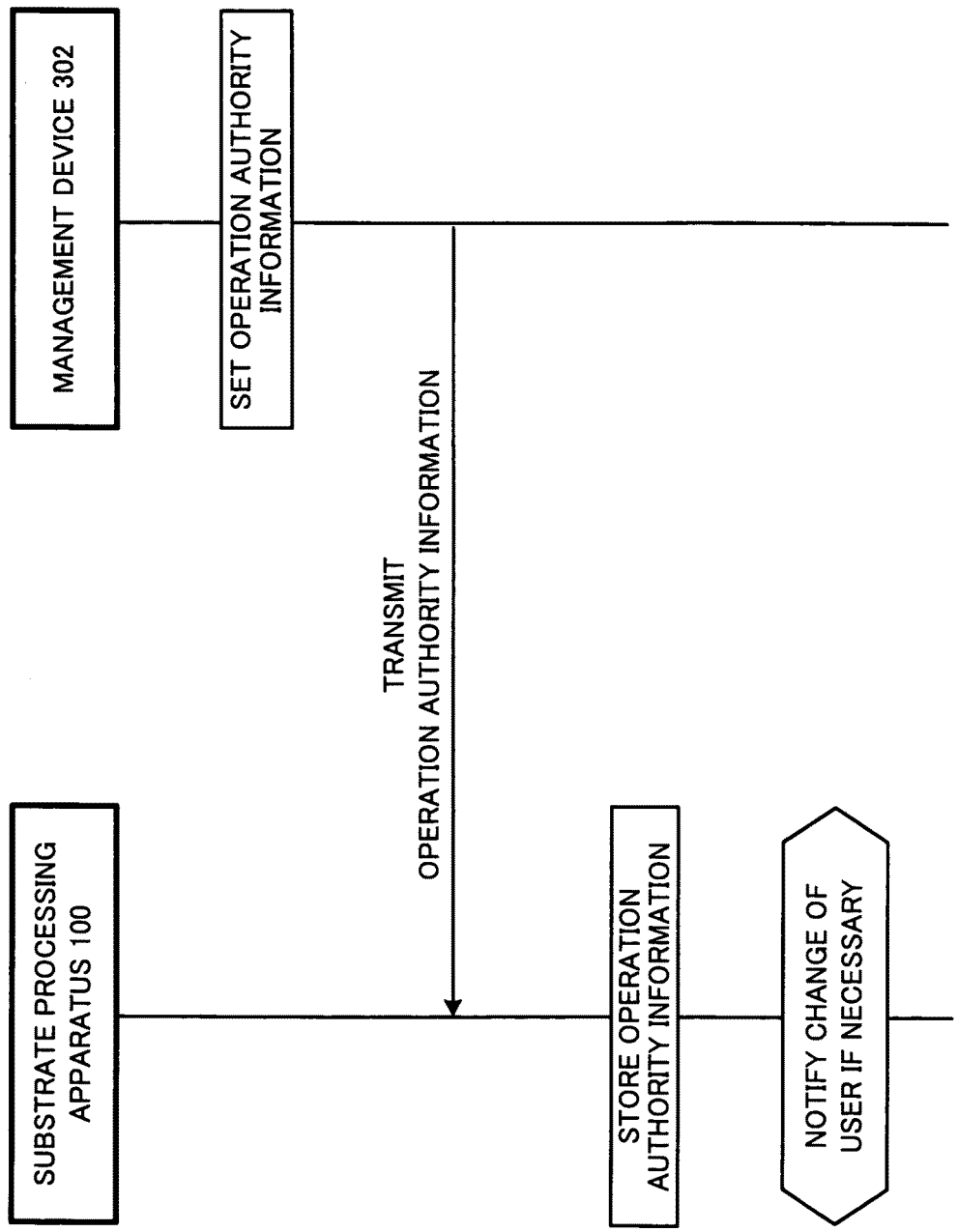

SUBSTRATE PROCESSING SYSTEM

TECHNICAL FIELD

The present invention relates to a substrate processing system included of a plurality of substrate processing apparatuses for processing a substrate and a management device for managing these substrate processing apparatuses, and particularly to a setting of the operation authority to the user of the management device and the plurality of substrate processing apparatuses in a substrate processing system.

BACKGROUND ART

In a substrate processing system of this kind, the operation authority to the user (e.g., an operator, a maintenance engineer, and a process engineer) of the substrate processing apparatus is set respectively in the substrate processing apparatus or in the management device. Conventionally, in the case of setting the operation authority in a plurality of substrate processing apparatus, the information (operation authority information) regarding the operation authority is input via an operation device provided to each substrate processing apparatus, or the operation authority information, which has once been set, is stored in an external storage medium, and then copied to each substrate processing apparatus via the storage medium. On the contrary, in the case of setting the operation authority on the management device, the operation authority information is input to the management device.

Here, the operation authority is for setting a limit on an available function of the management device or the substrate processing apparatus (operation device) for each user with the purpose of preventing erroneous operations and so on. Further, the operation authority information denotes the information indicative of what functions are provided to each user, or what operation right is set to each user with respect to each of the substrate processing apparatus and the management device regarding each of these functions.

DISCLOSURE OF THE INVENTION

Problems that the Invention is to Solve

However, since setting of the operation right to the management device and setting of the operation right to the substrate processing apparatus are executed separately, in the case of setting the operation right to all of the substrate processing apparatuses, the number of man-hour is large, and wrong setting might be executed.

The present invention has an object of providing a substrate processing system capable not only of solving the conventional problem described above to make it easy to set the operation authority in the substrate processing apparatus and the management device, but also of allowing each of the users to visually check the operation authority information set to each of the substrate processing apparatuses and the management device.

Means for Solving the Problem

A first feature of the present invention is a substrate processing system including a plurality of substrate processing apparatuses for performing processing of a substrate, and a management device connected to the plurality of substrate processing apparatuses via a communication line, wherein the management device includes a screen used for setting operation authority information for each user to each of the management device and the plurality of substrate processing apparatuses capable of communicating with the management device.

Preferably, an available function and an operation right to the function are displayed on the screen for each user.

Further, it is preferable that a section for setting an available function and an operation right to the function for each user is displayed on the screen.

Further a second feature of the present invention is a substrate processing system including a plurality of substrate processing apparatuses for performing processing of a substrate, and a management device connected to the plurality of substrate processing apparatuses via a communication line, wherein the management device judges, in response to the operation authority information of the user being changed on an operation device in a predetermined substrate processing apparatus and the changed operation authority information being transmitted, whether or not there is a difference between the transmitted operation authority information and the operation authority information of another substrate processing apparatus set for the user, makes the operation device of the predetermined substrate processing apparatus display warning, updates the operation authority information set to the management device, and transmits the updated operation authority information to the another substrate processing apparatus if there is a difference to match the operation authority information for the user between the predetermined substrate processing apparatus and the another substrate processing apparatus.

Further a third feature of the present invention is a substrate processing system including a plurality of substrate processing apparatuses for performing processing of a substrate, and a management device connected to the plurality of substrate processing apparatuses via a communication line, wherein the management device judges, when performing a predetermined process, in response to the operation authority information of the user being changed on an operation device in a predetermined substrate processing apparatus and the changed operation authority information being transmitted, whether or not there is a difference between the transmitted operation authority information and the operation authority information of another substrate processing apparatus set for the user, makes an operation device of the predetermined substrate processing apparatus display warning, waits until the predetermined process is terminated if there is a difference, and stores the operation authority information relating to the user transmitted from the predetermined substrate processing apparatus when the predetermined process is terminated.

Advantage of the Invention

According to the present invention, since the management device has a screen used for setting the operation authority information to each of the management device and a plurality of substrate processing apparatuses capable of communicating with the management device for each user, it is possible not only to make setting of the operation authority in the plurality of substrate processing apparatuses and the management device easy, but also to visually check the operation authority information set to each of the substrate processing apparatuses and the management device for each user.

BRIEF DESCRIPTION OF THE DRAWINGS

FIG. 5 is a diagram exemplifying the operation authority information displayed on a display screen of the management device according to an embodiment of the present invention.

FIG. 6 is a ladder diagram for explaining a setting method of the operation authority information by the management device according to an embodiment of the present invention.

DESCRIPTION OF REFERENCE NUMERALS AND SIGNS

Figure 1:
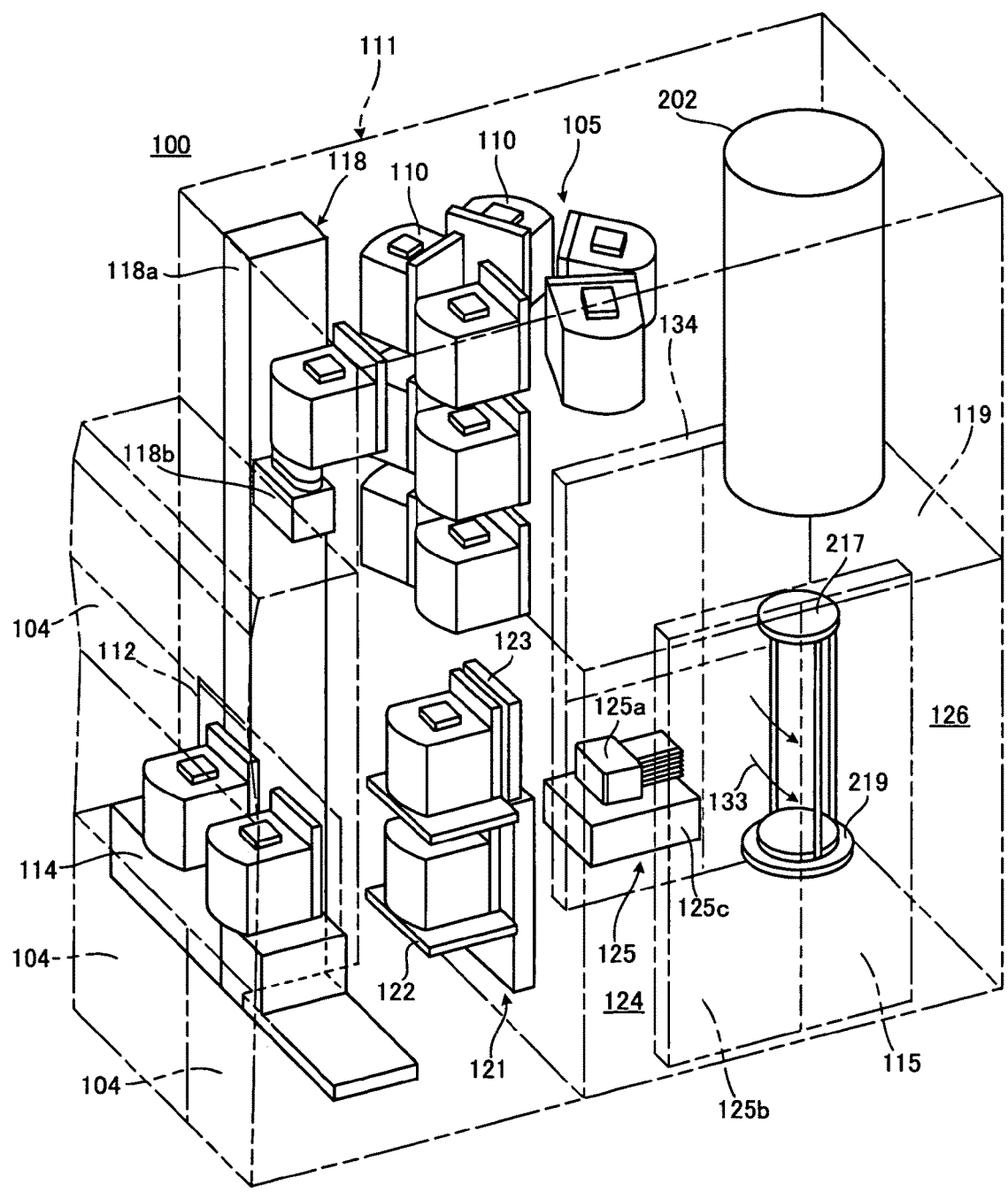
FIG. 1 is a perspective view showing a substrate processing apparatus according to an embodiment of the present invention.

100: substrate processing apparatus
300: substrate processing system
302: management device
304: operation device
308: communication line
350: display screen
352: operation authority setting table
370: display screen
372: operation authority setting table

BEST MODE FOR CARRYING OUT THE INVENTION

In the best mode for carrying out the present invention, the substrate processing apparatus is configured as a semiconductor manufacturing apparatus for implementing a processing device in a manufacturing method of a semiconductor device (IC) as an example. It should be noted that in the following explanations, the case in which a vertical apparatus (hereinafter simply referred to as a processing apparatus) for executing an oxidation/diffusion process, a CVD process, and so on is applied as the substrate processing apparatus will be described. FIG. 1 is shown as a perspective view of the substrate processing apparatus applied to the present invention. Further, FIG. 2 is a see-through side view of the substrate processing apparatus shown in FIG. 1.

Figure 2:
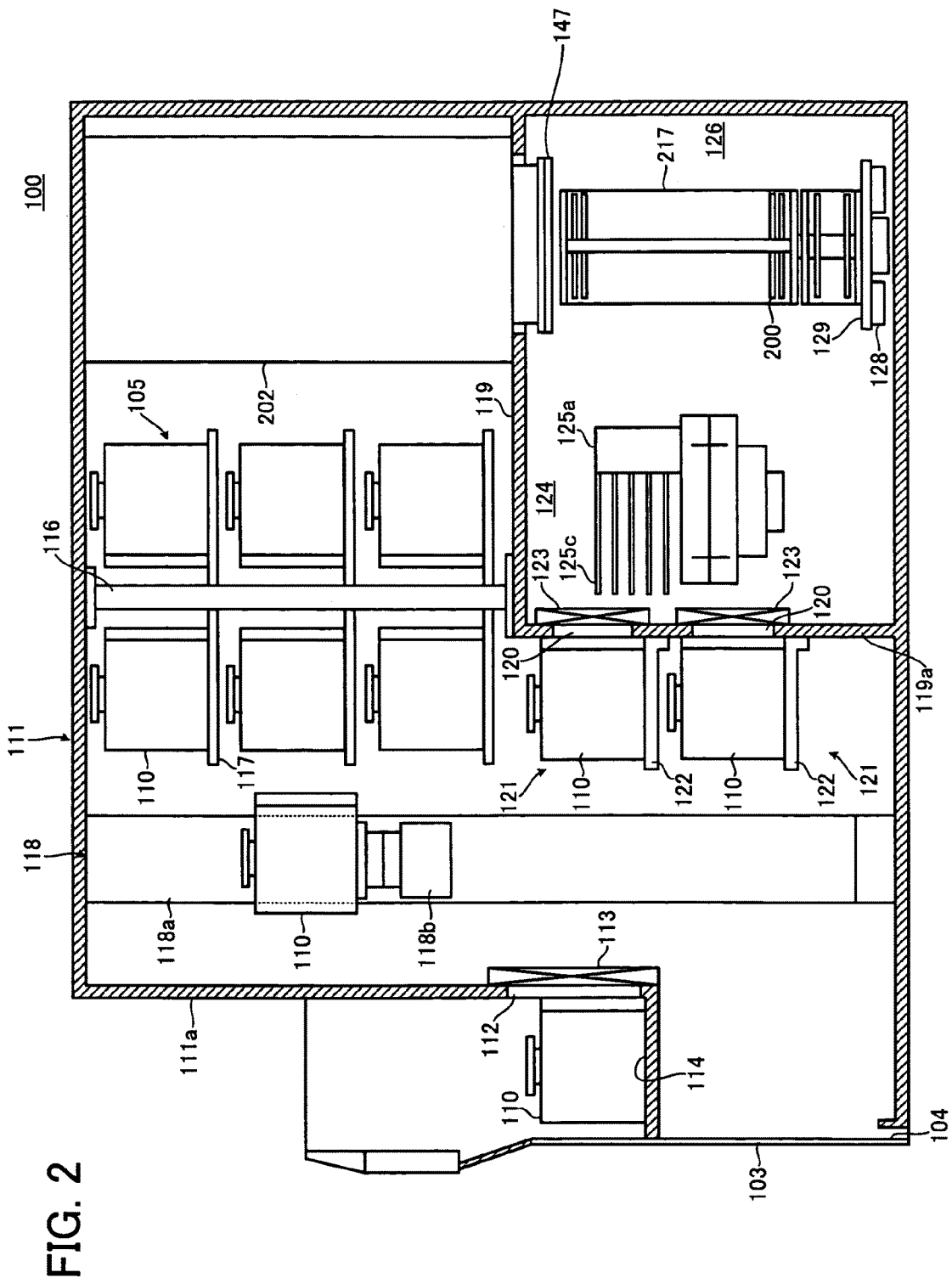
FIG. 2 is a see-through side view showing a substrate processing apparatus according to an embodiment of the present invention.

As shown in FIGS. 1 and 2, the substrate processing apparatus 100 of the present invention, in which a FOUP (Front Opening Unified Pod, hereinafter referred to as a pod) 110 is used as a wafer carrier housing an wafer (substrate) 200 made of silicon or the like, is provided with a housing 111. In an anterior portion of a front face of a front wall 111a of the housing 111, there is opened a front maintenance opening 103 as an opening section provided for allowing maintenance, and front maintenance doors 104, 104 for opening/closing the front maintenance opening 103 are built respectively. It should be noted that an operation device 304, which will be described later, is therefore omitted here.

In the front wall 111a of the housing 111, there is opened a pod carry-in/out opening (a substrate container carry-in/out opening) 112 so as to communicate the inside and the outside of the housing 111, and the pod carry-in/out opening 112 is arranged to be opened/closed by a front shutter (a substrate container carry-in/out opening opening/closing mechanism) 113.

On the front anterior side of the pot carry-in/out opening 112, there is disposed a load port (a substrate container delivery platform) 114, and the load port 114 is configured to mount the pod 110 for alignment. It is arranged that the pod 110 is carried-in on the load port 114 by an in-process carrier device (not shown), and is also carried-out from on the load port 114.

In the upper part of substantially the center portion in an anteroposterior direction inside the housing 111, there is disposed a rotary pod shelf (a substrate container mounting shelf) 105, and the rotary pod shelf 105 is configured to store more than one pods 110. In other words, the rotary pod shelf 105 is provided with a column 116 vertically erected and intermittently rotated in a horizontal plane, and a plurality of shelf boards (substrate container mounting platforms) 117 radially supported by the column 116 at each of positions of upper, middle, and lower stages, and the plurality of shelf boards 117 is configured so that each holds more than one pods 110 in a mounting condition.

Between the load port 114 and the rotary pod shelf 105 inside the housing 111, there is disposed a pod carrier device (a substrate container carrier device) 118, and the pod carrier device 118 is composed of a pod elevator (a substrate container elevating mechanism) 118a and a pod carrier mechanism (substrate container carrier mechanism) 118b as a carrier mechanism, further, the pod carrier device 118 is configured to carry the pod 110 among the load port 114, the rotary pod shelf 105, and a pod opener (a substrate container lid member opening/closing mechanism) 121 with an interconnected operation of the pod elevator 118a and the pod carrier mechanism 118b.

In the lower part of substantially the center portion in an anteroposterior direction inside the housing 111, there is built a sub-housing 119 extending to the posterior end. In the front wall 119a of the sub-housing 119, there is opened a pair of wafer carry-in/out openings (substrate carry-in/out openings) 120 for carrying-in/out wafer 200 to/from the inside of the sub-housing 119 arranged vertically in two columns, namely upper and lower columns, and the upper and lower columns of the wafer carry-in/out openings 120, 120 are provided with a pair of pod openers 121, 121, respectively. The pod openers 121 are provided with mounting platforms 122, 122 for mounting the pods 110, and cap putting-on/taking-off mechanisms (lid member putting-on/taking-off mechanisms) 123, 123 for putting-on/taking-off the cap (the lid members) of the pods 110. The pod-opener 121 is configured to open/close a wafer taking-out/putting-in opening of the pod 110 by putting-on/taking-off the cap of the pod 110 mounted on the mounting platform 122 by the cap putting-on/taking-off mechanism 123.

The sub-housing 119 forms a transfer chamber 124 fluidically isolated from an installation space of the pod carrier device 118 and the rotary pod shelf 105. In the anterior area of the transfer chamber 124, there is installed a wafer transfer mechanism (a substrate transfer mechanism) 125, and the wafer transfer mechanism 125 is composed of a wafer transfer device (a substrate transfer device) 125a capable of rotating the wafer 200 in a horizontal direction or linearly moving the wafer 200 and a wafer transfer device elevator (a substrate transfer device elevating mechanism) 125b for elevating the wafer transfer device 125a. As schematically shown in FIG. 1, the wafer transfer device elevator 125b is disposed between the right side end of the pressure-proof housing 111 and the right end of the anterior area of the transfer chamber 124 of the sub-housing 119. It is arranged that according to an interconnected operation of the wafer transfer device elevator 125b and the wafer transfer device 125a, the wafer 200 is charged to or discharged from a boat (substrate holding equipment) 217 using tweezers (substrate holding members) 125c of the wafer transfer device 125a as mounting sections of the wafers 200.

In the posterior area of the transfer chamber 124, there is formed a standby section 126 for housing the boat 217 to put the boat in a standby state. Above the standby section 126, there is provided a processing furnace 202. The lower end of the processing furnace 202 is arranged to be opened/closed by a furnace opening shutter (a furnace opening open/close mechanism) 147.

As schematically shown in FIG. 1, between the right side end of the pressure-proof housing 111 and the right end of the standby section 126 of the sub-housing 119, there is disposed a boat elevator (a substrate holding equipment elevating mechanism) 115 for elevating the boat 217. An arm 128 as a coupler coupled with an elevating stage of the boat elevator 115 is provided with a seal cap 219 as a lid member fixed horizontally thereto, and the seal cap 219 is arranged to support the boat 217 vertically so as to be able to seal the bottom of the processing furnace 202.

The boat 217 is provided with more than one holding members, and is configured so as to hold more than one (e.g., about 50 through 125) wafers 200 arranged in a vertical direction with the centers thereof aligned in a manner horizontal to each other.

As schematically shown in FIG. 1, in the left side end, which is the opposite side to the side of the wafer transfer device elevator 125b in the transfer chamber 124 and the side of the boat elevator 115, there is installed a clean unit 134 composed of a supply fan and a dust filter so as to supply clean air 133, which is cleaned ambient air or an inactive gas, and between the wafer transfer device 125a and the clean unit 134, there is installed a notch alignment device 135 as a substrate alignment device for aligning a circumferential position of the wafer, although not shown in the drawings.

It is arranged that the clean air 133 blowing out from the clean unit 134 flows through the notch alignment device 135, the wafer transfer device 125a, the boat 217 existing in the standby section 126, and is then suctioned by a duct, not shown, to be exhausted to the outside of the housing 111, or circulated to the upstream (supply side), the suctioning side of the clean unit 134, and discharged again by the clean unit 134 to the inside of the transfer chamber 124.

An operation of the substrate processing apparatus 100 according to the present invention will hereinafter be explained.

As shown in FIGS. 1 and 2, when the pod 110 is supplied to the load pot 114, the pod carry-in/out opening 112 is opened by the front shatter 113, and the pod 110 on the load port 114 is carried into the housing 111 from the pod carry-in/out opening 112 by the pod carrier device 118.

The pod 110 thus carried in is automatically carried by the pod carrier device 118 to the designated shelf board 117 of the rotary pod shelf 105 to be delivered to the shelf board 117, and is temporarily stored. After then, the pod 110 is carried from the shelf board 117 to one of the pod openers 121 to be delivered thereto, and temporarily stored. After then, the pod 110 is carried from the shelf board 117 to one of the pod openers 121, and transferred to the mounting platform 122. Alternatively, the pod 110 thus carried in is directly carried to the pod opener 121, and transferred to the mounting platform 122. In this case, the wafer carry-in/out opening 120 of the pod opener 121 is closed by the cap putting-on/taking-off mechanism 123, and the clean air 133 flows through the transfer chamber 124, thus the transfer chamber 124 is filled with the clean air 133. For example, by filling the transfer chamber 124 with nitrogen gas as the clean air 133, the transfer chamber 124 is set to have an oxygen concentration of no higher than 20 ppm which is much lower than the oxygen concentration of the inside (ambient atmosphere) of the housing 111.

The pod 110 mounted on the mounting platform 122 is pressed against the periphery section of the wafer carry-in/out opening 120 in the front wall 119a of the sub-housing 119 in the opening side end face, and has the cap thereof removed by the cap putting-on/taking-off mechanism 123 to open the wafer taking-out/putting-in opening thereof.

When the pod 110 is opened by the pod opener 121, the wafer 200 is picked-up from the pod 110 through the wafer taking-out/putting-in opening by the tweezers 125c of the wafer transfer device 125a, and the wafer is aligned in the notch alignment device 135, not shown, and then carried into the standby section 126 disposed in the posterior section of the transfer chamber 124 to be charged to the boat 217. The wafer transfer device 125a which has delivered the wafer 200 to the boat 217 returns to the pod 110 to charge the next wafer 110 to the boat 217.

During the charging operation of the wafer to the boat 217 by the wafer transfer mechanism 125 in the one (the upper or lower stage) of the pod openers 121, another pod 110 is carried to the other (the lower or upper stage) of the pod openers 121 from the rotary pod shelf 105 by the pod carrier device 118 to be transferred thereto, thus the opening operations of the pods 110 by the pod openers 121 are carried on concurrently.

When the previously designated number of wafers 200 is charged to the boat 217, the bottom section of the processing furnace 202 closed by the furnace opening shutter 147 is then opened by the furnace opening shutter 147. Subsequently, the seal cap 219 is raised by the boat elevator 115, thereby loading the boat 217 holding the group of wafers 200 into the processing furnace 202.

After loading, an arbitrary processing is executed on the wafers 200 in the processing furnace 202.

After processing, the wafers 200 and the pods 110 are discharged outside the housing in a substantially opposite procedure except the alignment step of the wafer in the notch alignment device 135 not shown.

Then, an example of a substrate processing system 300 using the substrate processing apparatus 100 described above will be explained based on FIG. 3 and FIG. 4.

Figure 3:
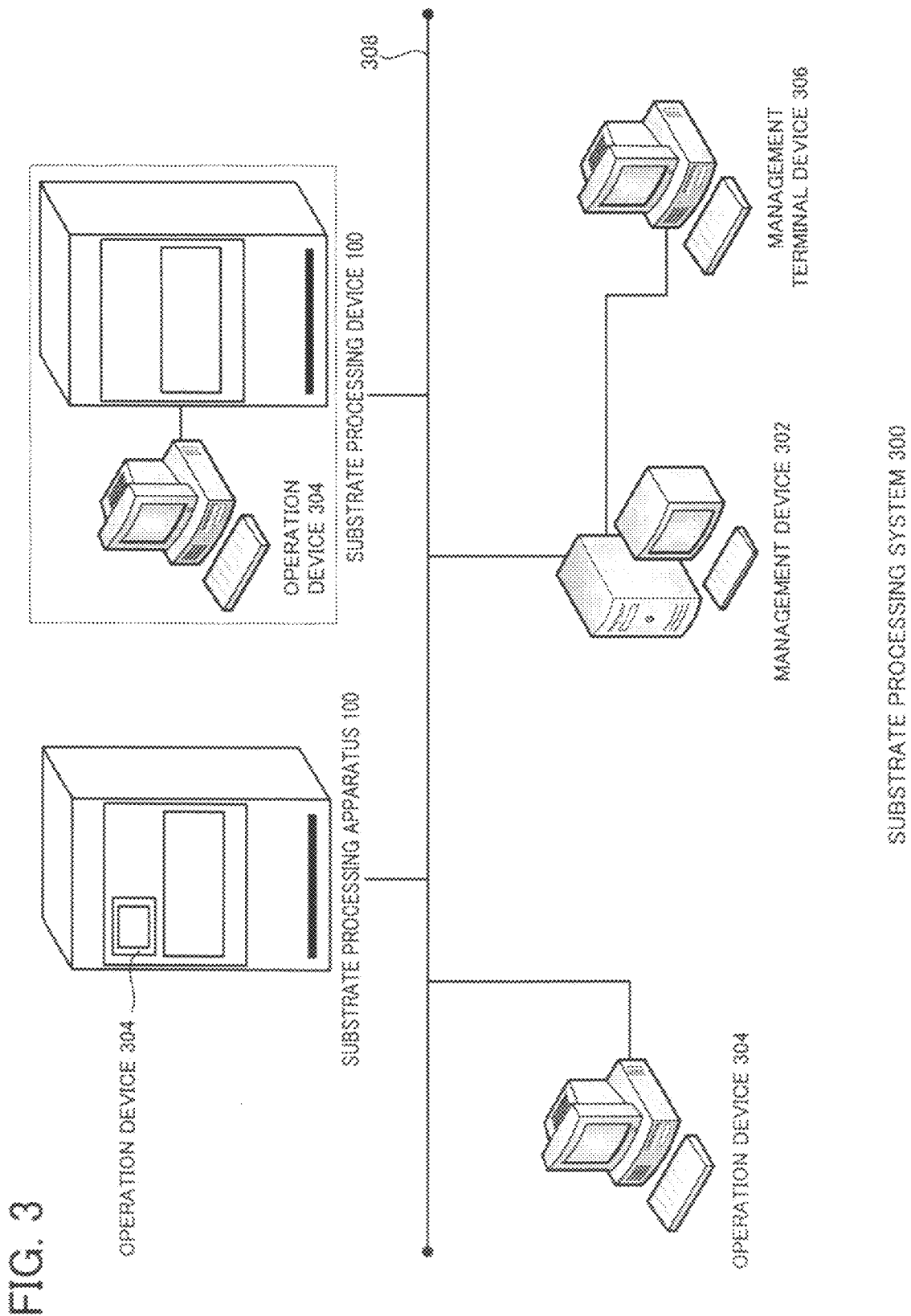
FIG. 3 is a schematic diagram showing a configuration of a substrate processing system according to an embodiment of the present invention.

As shown in FIG. 3, the substrate processing system 300 has a management device 302, the substrate processing apparatuses 100 described above, and a communication line 308 such as a LAN for connecting the management device 302 and a plurality of substrate processing apparatuses 100 to each other. The substrate processing apparatuses 100 are respectively provided with operation devices 304 integrally with the substrate processing apparatuses 100 or via a network, and the setting of each of the functions described later is performed by the operation devices 304. Further, a management terminal device 306 is connected to the management device 302 via the network, and the setting of each of the functions described later is performed by the management device 302 and the management terminal device 306. It should be noted that the operation device 304 can be connected to the communication line 308 without the substrate processing apparatus 100 in between.

Figure 4:
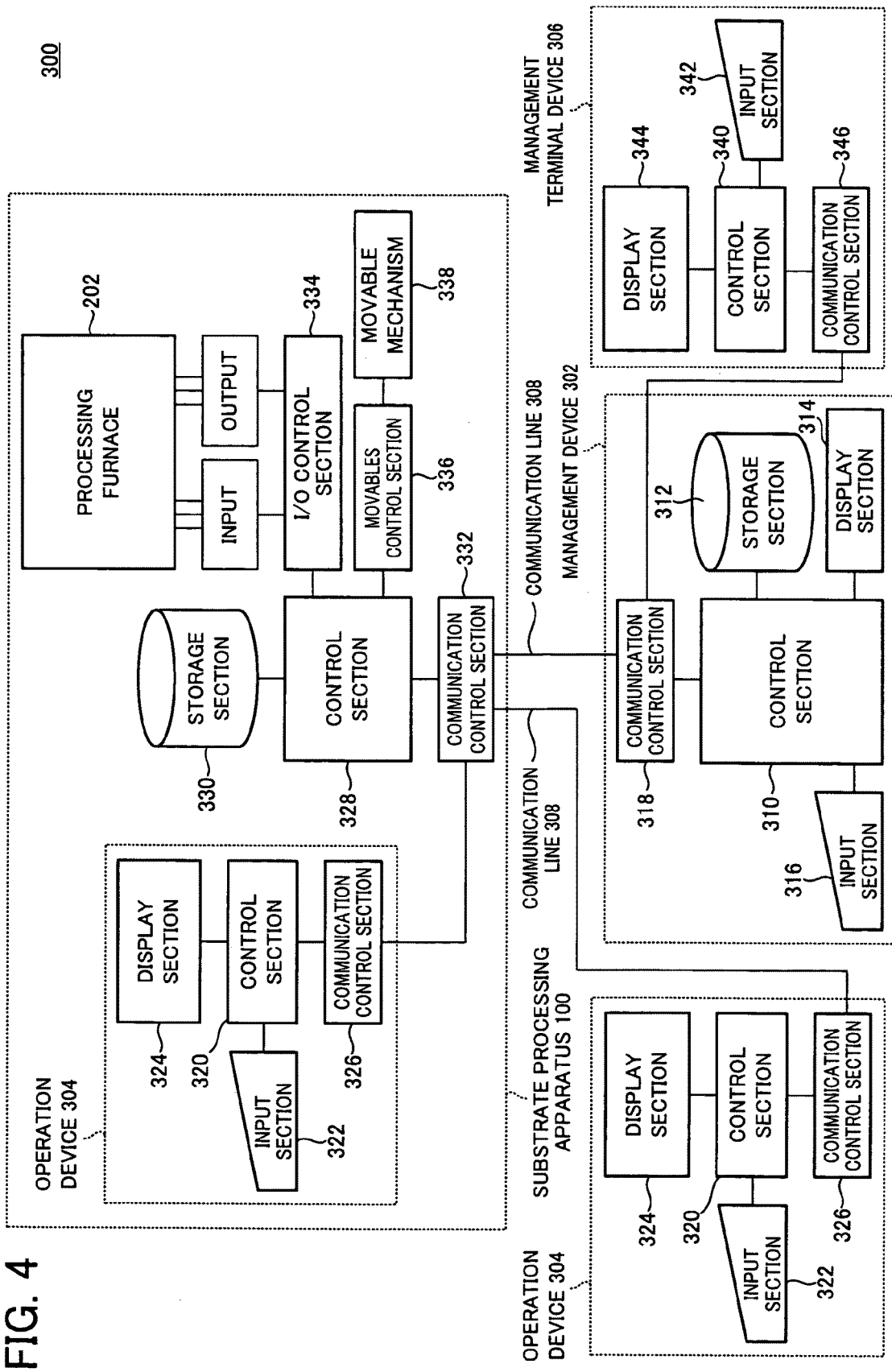
FIG. 4 is a block diagram showing a detailed configuration of a substrate processing system according to an embodiment of the present invention.

As shown in FIG. 4, the management device 302 has a control section 310, a storage section 312, a display section 314, an input section 316, and a communication control section 318. The control section 310 performs data input/output among the storage section 312, the display section 314, the input section 316, and the communication control section 318. The input section 316 accepts an input from the system manager and so on, and outputs the input data to the control section 310. The storage section 312 stores the data output from the control section 310, and outputs the data (data regarding available functions in the management device 302 or the substrate processing apparatus 100 described later and an operation right described later, and files such as a recipe) stored previously to the control section 310. The display section 314 has a display screen 350 described later, and displays the data output from the control section 310 on the display screen 350. The communication control section 318 is connected to the communication line 308, and controls data input/output between other devices connected to the communication line 308 and the management device 306. It should be noted that the display section 314 can be an input-cum-display section having display part and input part.

The operation device 304 has a control section 320, an input section 322, a display section 324, and a communication control section 326. The control section 320 performs data input/output among the input section 322, the display section 324, and the communication control section 326. The input section 322 accepts an input from the system manager and so on, and outputs the input data to the control section 320. The display section 324 has a display screen 370 described later, and displays the data output from the control section 320 on the display screen 370. The communication control section 326 is connected to the communication line 308, and controls data input/output between other devices connected to the communication line 308 and the operation device 304. It should be noted that the display section 324 can be an input-cum-display section having display parts and input parts.

The substrate processing apparatus 100 has a control section 328, the storage section 330, the communication section 332, and the operation device 304 described above. The control section 328 performs data input/output between the storage section 330, and the communication control section 332. The storage section 330 stores the data output from the control section 328, and outputs the data stored therein to the control section 328. The storage section 330 stores not only the data of functions available in the substrate processing apparatus 100 but also the data regarding the operation authority and so on, and the files such as a recipe file and so on. The communication control section 332 is connected to the communication line 308, and controls data input/output between other devices connected to the communication line 308 and the substrate processing apparatus 100.

Further, the control section 328 has an I/O control section 334 and a movables control section 336. The I/O control section 334 outputs control data to adjusting device (e.g., a heater, and gas flow valve) for adjusting the temperature and pressure inside the reactor 202, and receives the detection data (data regarding e.g., temperature, amount of gas flow, and pressure) from a plurality of sensors for detecting conditions inside the reactor 202. The movables control section 336 controls operations of a movable mechanism 338 (including e.g., the boat elevator 115, the pod carrier device 118, the wafer transfer device 125 described above).

The management terminal device 306 has a control section 340, an input section 342, a display section 344, and a communication control section 346. The control section 340 performs data input/output among the input section 342, the display section 344, and the communication control section 346. The input section 342 accepts an input from the system manager and so on, and outputs the input data to the control section 340. The display section 344 displays the data output from the control section 340. The communication control section 346 is connected to the communication line 308, and controls data input/output between other devices connected to the communication line 308 and the management terminal device 306.

Hereinafter, a setting method of operation authority information in the management device 302 and the substrate processing apparatus 100 (the operation device 304) will be explained based on FIGS. 5 through 9.

The purpose of setting the operation authority information is to prevent erroneous operations by adding limitations to the right (the operation right) to operate the available functions in the management device 302 and the substrate processing apparatus 100 (the operation device 304) for each user (e.g., an operator, a maintenance engineer, and a process engineer), and consequently, to prevent an unnecessary rest (a rest caused by an unnecessary error or failure) of the substrate processing apparatus 100.

A method of setting the operation authority information in the management device 302 will be explained.

As shown in FIG. 5, the system manager makes an operation authority setting table 352 be displayed on the display screen 350 provided to the display section 314 (shown in FIG. 4) of the management device 302. The operation authority setting table 352 has an ID input section 354, a password input section 356, a function input section 358, a management device operation authority input section 360, and an operation device operation authority input section 362. Subsequently, the system manager and so on inputs a user ID and a user password as identification information of the user respectively to the ID input section 354 and the password input section 356. Each user is previously provided with the user ID and the user password corresponding to the user ID as the identification information of the user.

Further, it is possible to display a user ID list (omitted from the drawings) by clicking the input section 354, and to select a predetermined user ID from the user ID list.

It should be noted that the system manager is a person who has an authority of determine the range of use by the user. Therefore, the operation authority setting table 352 can be displayed only to the system manager.

Subsequently, the system manager sets the information of the operation authority of the management device 302 and the substrate processing apparatus 100 (the operation device 304) regarding a predetermined user to the operation authority setting table 352. Specifically, the system manager sets each of the functions of the management device 302 and the substrate processing apparatus 100 (the operation device 304) to the function input section 358, sets the operation right of the management device 302 corresponding to each of the functions to the management device operation authority input section 360, inputs the operation right of the substrate processing apparatus 100 (the operation device 304) corresponding to each of the functions to the operation device operation authority input section 362, and then holds down the SAVE button 368. Each piece of information in the operation authority setting table 352 set by the system manager is stored in the storage section 312 (shown in FIG. 4) of the management device 302 as the operation authority information when the SAVE button 368 is held down. As described above, since the operation right of the management device 302 and the operation right of the substrate processing apparatus 100 (the operation device 304) regarding the predetermined user can be set on the same screen, setting errors of the operation right can be suppressed. Incidentally, it is possible to perform the setting of each of the functions after being previously displayed in the different conditions depending on whether or not the predetermined user is, for example, an operator and a service engineer. It should be noted that the setting of the operation right can preferably be performed by selection.

It should be noted that it is arranged that the operation authority information stored in the storage section 312 of the management device 302, as shown in FIG. 5, is displayed on the display screen 350 of the management device 302, and every time the user ID in the ID input section 354 is changed, the operation authority information regarding each of the users is displayed by switching.

The operation rights in the present embodiment include, as shown in FIG. 5, EXECUTION ALLOWED, EDITING ALLOWED, BROWSING ALLOWED, EXECUTION NOT ALLOWED, BROWSING NOT ALLOWED, and so on, and these operation rights can be described with inequality signs as follows.

BROWSING NOT ALLOWED or EXECUTION NOT ALLOWED<BROWSING ALLOWED<EDITING ALLOWED or EXECUTION ALLOWED

Here, the operation rights on the right hand of the above inequality signs include the operation rights on the left hand of the above inequality signs. For example, in the case of having the authority of "EDITING ALLOWED," browsing is also allowed.

Here, each of the functions of the management device 302 and the substrate processing apparatus 100 (the operation device 304) shown in FIG. 5 will be explained.

"AGGREGATE INFORMATION MONITOR" denotes a function of aggregating operational conditions of more than one substrate processing apparatus 100 to be displayed as a list on the display screen 350 of the management device 302. For example, whether the host control is online or offline, a device mode, an alarm out condition, a recipe in progress, an estimated completion time of the recipe are displayed.

"DETAILED INFORMATION MONITOR" denotes a function of displaying a detailed operational condition of a predetermined substrate processing apparatus 100. For example, heater temperature, an amount of gas flow, opening/closing of valves, pressure in the furnace, statuses of the mechanisms, conditions of the materials (e.g., the pod and the wafer), and detection states of various sensors are displayed.

"TRACE DATA" denotes a function of plotting the data, which is the variation in the operational condition of the predetermined substrate processing apparatus 100 obtained with a constant period, with respect to the time axis to display as a graph.

"FAILURE INFORMATION" denotes a function of displaying an occurrence history of failures caused in a predetermined substrate processing apparatus 100 in chronological order as a list, or displaying detailed condition of the substrate processing apparatus 100 upon occurrence of a failure.

Further, "RECIPE EDITING" denotes a function of uploading the recipe stored in the storage section of a designated substrate processing apparatus 100 to edit the recipe in the management device 302 or the substrate processing apparatus 100 (the operation device 304). Here, the recipe denotes an aggregate of a sequence program and setting values for processing the wafers in the substrate processing apparatus 100.

"TABLE EDITING" denotes a function of editing a table used in the designated substrate processing apparatus 100. As the table, there can be cited a temperature correction table, an alarm condition table setting a condition for outputting an alarm, a table defining operational speeds and positions of each of the movable sections, and so on.

"REMOTE COMMAND" denotes a function of transmitting commands for controlling the substrate processing apparatus 100 in a remote manner in the operation device 304 located distantly from the managing device 302 and the substrate processing apparatus 100. As the command used as the remote command, there can be cited commands for starting/stopping the recipe, step-jumping, clearing the alarm, inputting/outputting of the lot.

It should be noted that the functions the management device 302 has includes the functions the substrate processing apparatus 100 (the operation device 304) has. There exist the functions, such as "AGGREGATE INFORMATION MONITOR," provided only to the management device 302.

Then, a method of setting the operation authority information, which is set in the management device 302, to the substrate processing apparatus 100 (the operation device 304) will be explained.

As shown in FIG. 6, in response to a DOWNLOAD button 364 (shown in FIG. 5) in the display screen 350 being held down, the operation authority information set in the management device 302 is transmitted (downloaded) to the substrate processing apparatus 100 from the storage section 312 (shown in FIG. 4) of the management device 302 via the communication line 308. On this occasion, at least the information regarding the operation right (the operation right input in the operation device operation authority input section 362 shown in FIG. 5) corresponding to each of the functions is transmitted. The substrate processing apparatus 100 (the operation device 304) stores the operation authority information transmitted form the management device 302 to the storage section 330 (shown in FIG. 4). Thus, each of the programs are executed in the substrate processing apparatus 100 based on the changed operation authority information. It should be noted that it is arranged that the user makes the changed operation authority information be displayed on the display section 324 (shown in FIG. 4) of the operation device 304 according to needs. Further, it is also possible to be arranged to select the user instead of transmitting all of the operation authority information stored in the storage section 312 in response to the DOWNLOAD button 364 being held down. Further, it is also possible to be arranged to select the substrate processing apparatus 100 to which the information is transmitted, further, it is also possible to select both of the user and the substrate processing apparatus 100.

Then, a method of setting the operation authority information in the substrate processing apparatus 100 (the operation device 304) will be explained.

Figure 7:
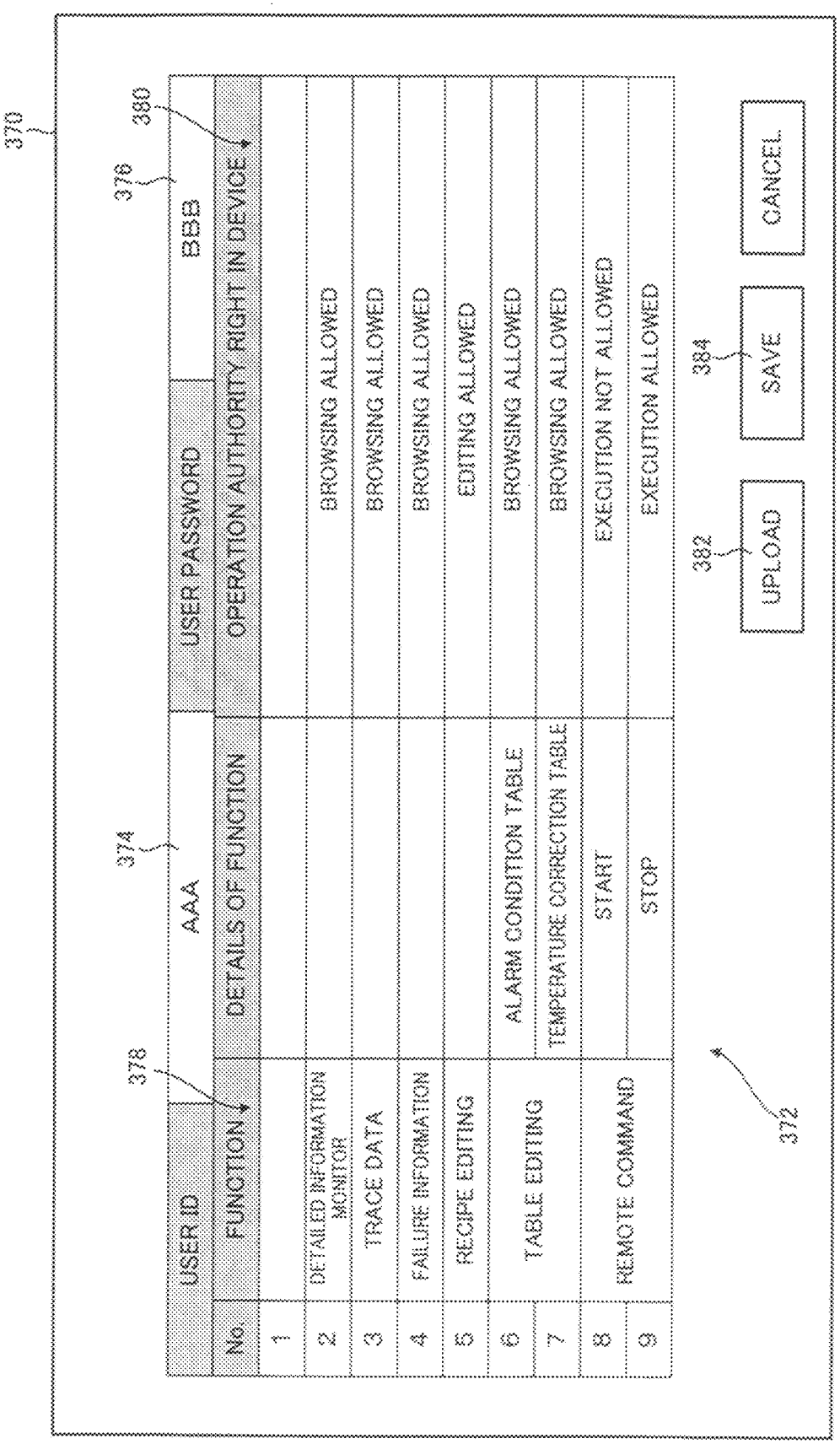
FIG. 7 is a diagram exemplifying the operation authority information displayed on a display screen of the substrate processing apparatus (operation device) according to an embodiment of the present invention.

As shown in FIG. 7, the system manager makes an operation authority setting table 372 be displayed on the display screen 370 provided to the display section 324 (shown in FIG. 4) of the operation device 304, inputs the user ID to an ID input section 374, and inputs the user password to a password input section 376. This operation authority setting table 372 has a function input section 378, an operation device operation authority input section 380 besides the ID input section 374, the password input section 376. Also on this occasion, who has the authority to open (display) this operation authority setting table 372 is only the system manager.

Subsequently, the system manager sets the operation authority of the substrate processing apparatus 100 (the operation device 304) to the operation authority setting table 372. Specifically, the system manager sets each of the functions of the substrate processing apparatus 100 (the operation device 304) to the function input section 378, sets the operation right of the substrate processing apparatus 100 (the operation device 304) corresponding to each of the functions to the operation device operation authority input section 380, and holds down the SAVE button 384. Each piece of information in the operation authority setting table 372 set by the system manager is stored in the storage section 330 (shown in FIG. 4) of the substrate processing apparatus 100 as the operation authority information when the SAVE button 384 is held down. It should be noted that it does not matter that setting of each function is set by displaying the setting of each function in a condition set previously depending on whether or not the user is, for example, an operator or a process engineer, and adding or deleting a function by the user.

Then, a method of setting the operation authority information, which is set in the substrate processing apparatus 100 (the operation device 304), to the management device 302 will be explained.

Figure 8:
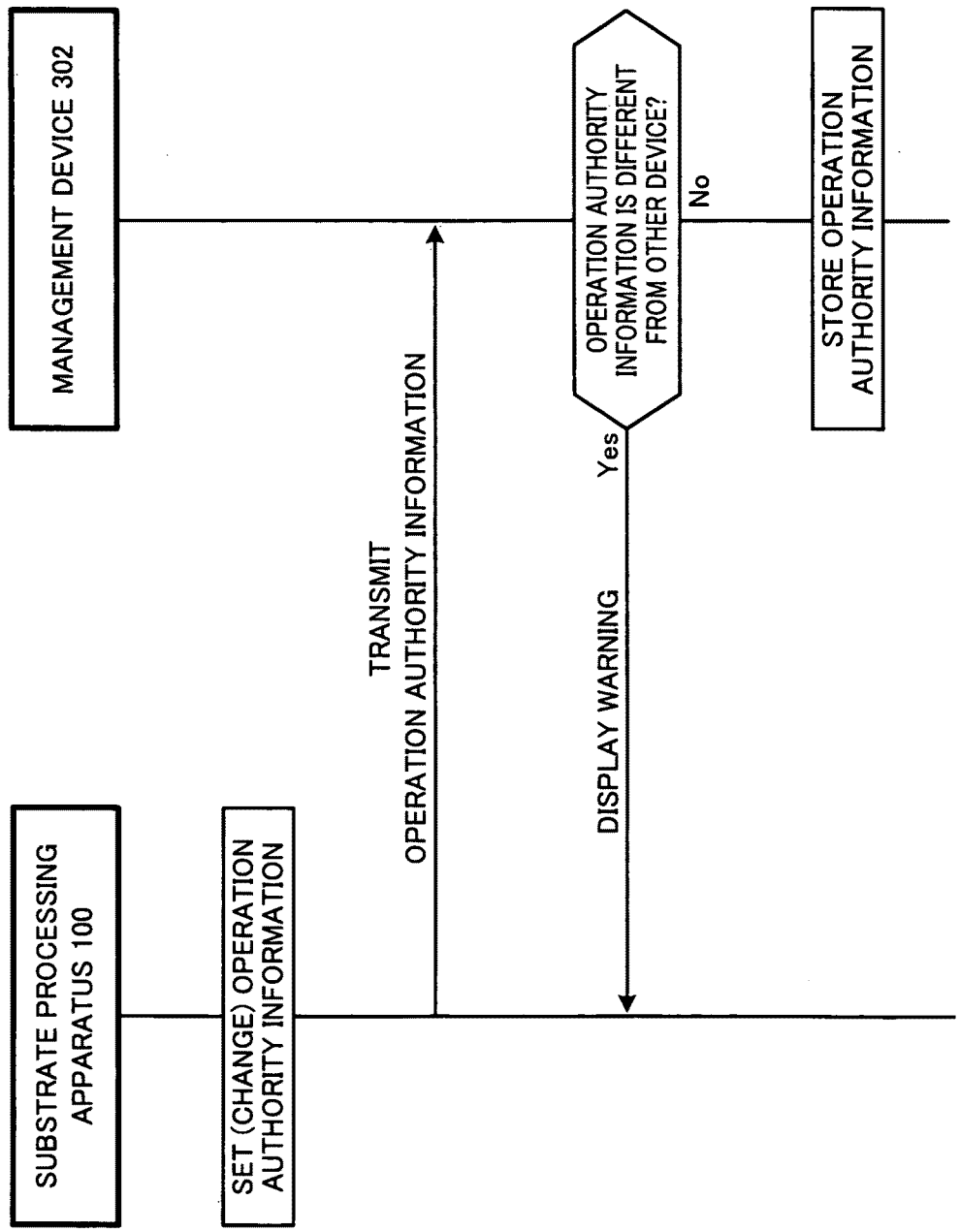
FIG. 8 is a first ladder diagram for explaining a setting method of the operation authority information by the substrate processing apparatus (operation device) according to an embodiment of the present invention.

As shown in FIG. 8, the operation authority information set (changed) in the substrate processing apparatus 100 (the operation device 304) is transmitted (uploaded) to the management device 302 from the storage section 330 (shown in FIG. 4) of the substrate processing apparatus 100 in response to the UPLOAD button 382 (shown in FIG. 7) of the display screen 370 of the operation device 304 being held down. Alternatively, in response to the UPLOAD button 382 (shown in FIG. 5) being held down with the user and so on designated in the display screen 350 of the management device 302, the operation authority information set (changed) in the operation device 304 is transmitted (uploaded) to the management device 302 from the substrate processing apparatus 100. On this occasion, if the management device 302 judges that there is a difference between the transmitted operation authority information and the operation authority information set in another substrate processing apparatus 100 (the operation device 304), the management device 302 displays warning on the display screen 370 of the operation device 304. On the contrary, if the management device 302 judges that there is no difference from the operation authority information set in other substrate processing apparatuses 100 (the operation devices 304) or that no operation authority information is set in other substrate processing apparatuses 100 (the operation devices 304), the management device 302 stores the operation authority information into the storage section 312 of the management device 302. Thus, the operation authority information set in the substrate processing apparatus 100 (the operation device 304) is set to the management device 302. More specifically, the data in the operation device operation authority input section 362 (shown in FIG. 5) of the operation authority setting table 352 displayed on the display screen 350 of the management device 302 is replaced with the operation authority information transmitted from the substrate processing apparatus 100 (the operation device 304), and the updated data in the operation device operation authority input section 362 is copied to the management device operation authority input section 360. On this occasion, the data of the functions (e.g., AGGREGATE INFORMATION MONITOR) unique to the management device 302 is not changed.

Further, it is possible to be arranged that even if the data in the operation device operation authority input section 362 is replaced with the operation authority information transmitted from the substrate processing apparatus 100, the data in the management device operation authority input section 360 is not automatically updated. Then, it is stored in the storage section 312 in response to the SAVE button 368 being held down.

The cancellation of the warning displayed on the display screen 370 of the operation device 304 is cancelled by various methods such as holding down the CANCEL button. Although not shown in the drawings, it can be arranged that the warning is cancelled in response to termination of the data update on the operation authority setting table 352 of the management device 302.

It can be considered to arrange that the restoring operation from a trouble or inputting/outputting of a material, for example, is performed only on the side of the substrate processing apparatus 100 (the operation device 304). There are some cases of restoring operations from troubles in which an operation from a distant place without checking the condition in a near location (the substrate processing apparatus 100 (the operation device 304)) might be dangerous. Further, in some cases of inputting/outputting materials, the materials are carried manually. In these cases, it is arranged that operations from a distant location (the management device 302) are not executed. Further, parameters (e.g., parameters relating to the device configuration) relating to the substrate processing apparatus 100 are factory setting, and are changed in the case of changing the device configuration for reconstruction and so on. In these cases, since there is a possibility of occurrence of an erroneous operation, the operation is performed only on the side of the substrate processing apparatus 100. Further, in these cases, since it is necessary to provide different settings to the operation authority information of the management device 302 and the operation authority information of the substrate processing apparatus 100 (the operation device 304) from each other, the operation authority information is input again to only a predetermined substrate processing apparatus 100 individually.

As shown in FIG. 8, when the operation authority information is changed, warning is displayed on the substrate processing apparatus 100 (the operation device 304). However, it is obvious that the restoring operation from a trouble, inputting/outputting of materials, and various operations in setting-up can be performed in the substrate processing apparatus 100.

The parameters relating to the device configuration set before shipment are hardly changed. However, when performing reconstruction (e.g., a change in the device construction caused by a change to the specification), a parameter change must be performed. After changing the setting, the setting-up is necessary in consideration of erroneous operations. Since the change to the setting is performed on the side of the substrate processing apparatus 100 side, the side of the management device 302 and the side of the substrate processing apparatus 100 are different from each other in the setting of the operation authority information. In the parameters of the device configuration described above, in some cases, although the operation information of the management device 302 and the operation authority information of the substrate processing apparatus 100 have different settings from each other during the setting-up (during a return operation), they are restored (each of the operation authority information is restored to be the same information) after the setting-up (after the termination of a recovery operation).

Figure 9:
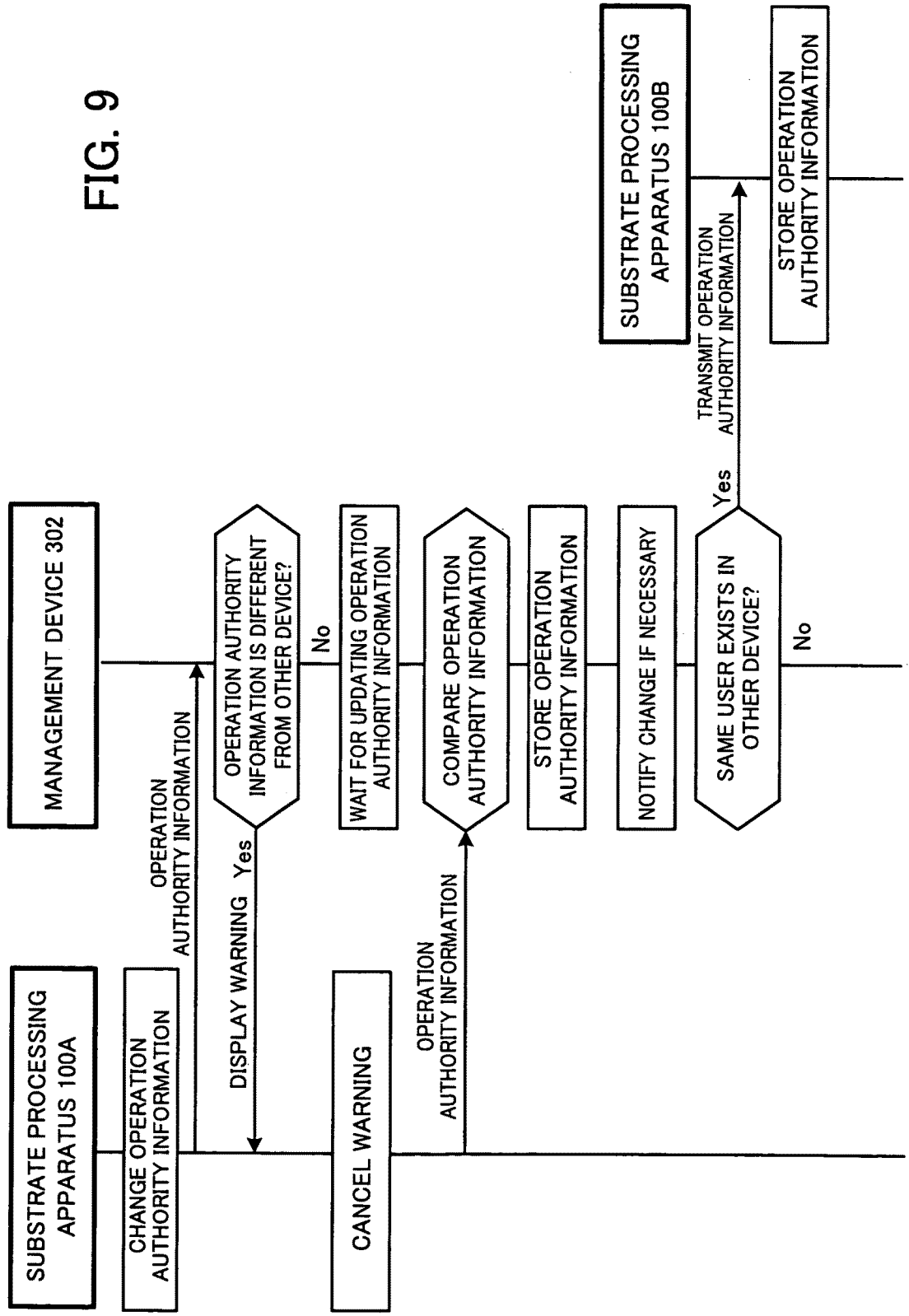
FIG. 9 is a second ladder diagram for explaining a setting method of the operation authority information by the substrate processing apparatus (operation device) according to an embodiment of the present invention.

FIG. 9 shows the data flow in such cases (e.g., restoring operation from the trouble, inputting/outputting of the materials, parameter change relating to the device configuration). As shown in FIG. 9, when the change to the setting of the operation authority is performed in the substrate processing apparatus 100A, the management device 302 is notified of the change. The management device 302 judges whether or not there is a difference from the information relating to the operation authority in another device, and displays warning on the display screen of the substrate processing apparatus 100A if there is a difference. Even if there is no difference, the management device waits for the operation authority information transmitted once again. When the user terminates the setup operation, the substrate processing apparatus 100A cancels the warning display, and at the same time notifies the management device 302 of the operation authority information. Upon reception of this notification, the management device 302 compares the operation information notified of and the operation right information held in the management device 302 with each other, updates (stores) the information relating to the operation authority, judges whether or not the updated data is reflected to another substrate processing apparatus 100B in which the same user is set, and downloads the information relating to the operation authority thus updated to another substrate processing apparatus 100B if it is allowed to be reflected, or directly terminates the process if it is not allowed to be reflected. It should be noted that it is also possible that the judgment whether or not the information relating to the operation authority transmitted in conjunction with the warning information notification is reflected to another device is performed by the substrate processing apparatus 100A, and the information of the result of the judgment is included in the warning cancellation notification described above.

Then, a method of matching the operation authority information between a plurality of substrate processing apparatuses 100 (the operation device 304) and the management device 302 will be explained.

Figure 10:
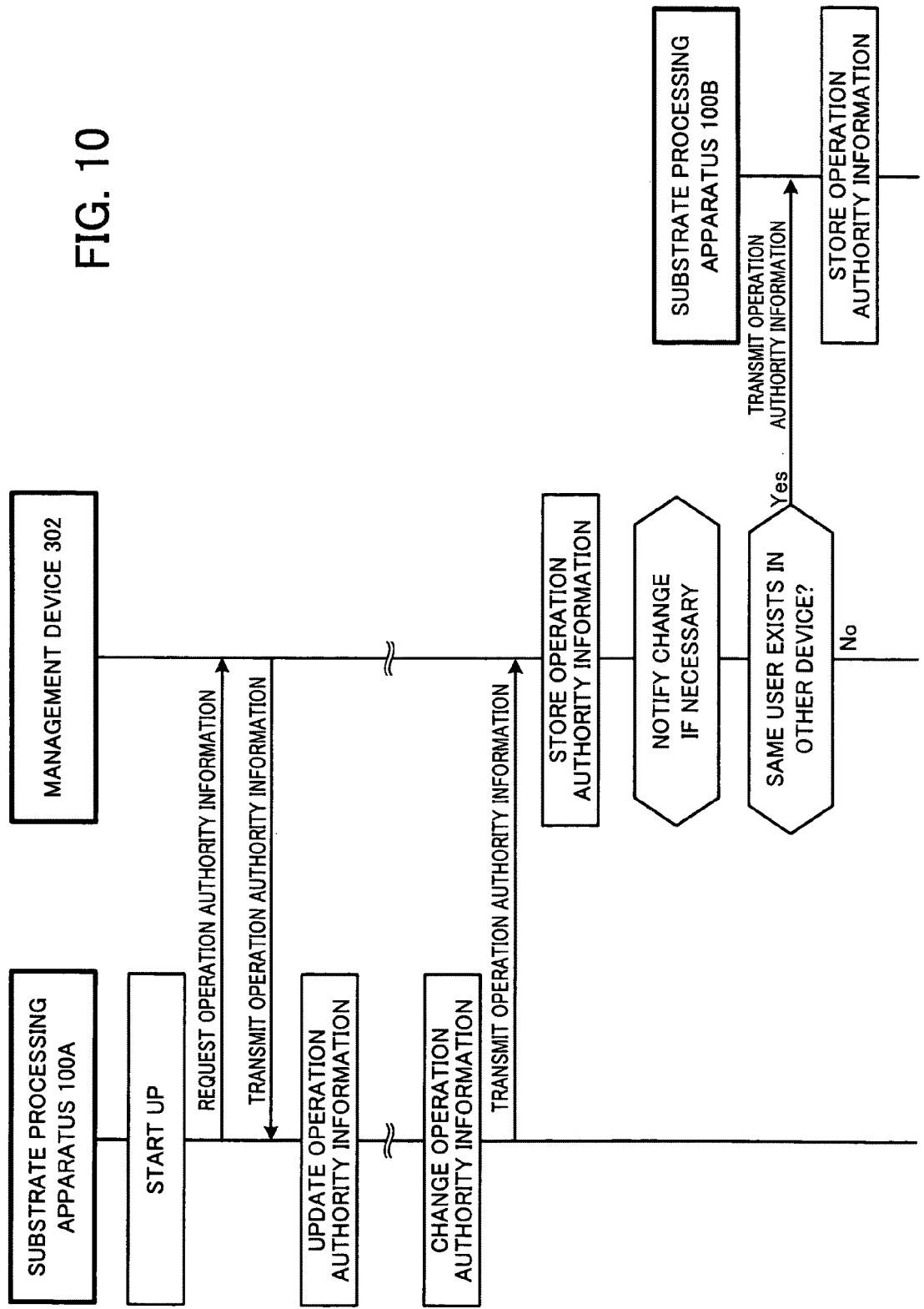
FIG. 10 is a ladder diagram for explaining a method for matching the operation authority information among the plurality of substrate processing apparatuses and the management device according to an embodiment of the present invention.

As shown in FIG. 10, when the substrate processing apparatus 100A is started up and the communication with the management device 302 is established, the substrate processing apparatus 100A requires the operation authority information of the management device 302. When accepting the request for the operation authority information from the substrate processing apparatus 100A, the management device 302 transmits (downloads) the latest operation authority information to the substrate processing apparatus 100A. The substrate processing apparatus 100A stores the operation authority information, and updates the operation authority information. Therefore, by updating the operation authority information of each of the substrate processing apparatuses 100 to the latest operation authority information of the management device 302 on the start-up of the substrate processing apparatuses 100, it is possible to maintain consistency between the operation authority information of the management device 302 and the operation authority information of each of the substrate processing apparatuses 100 (operation devices 304). Further, easy setting and changing of the operation authority in the substrate processing apparatus 100 (the operation device 304) also becomes possible.

Further, it is possible to set the operation authority information set in the substrate processing apparatus 100A to another substrate processing apparatus 100B. Specifically, it is shown in FIGS. 8 and 9, and detailed description will be omitted. In FIG. 10, when the operation authority information changed in the substrate processing apparatus 100A is transmitted (uploaded) to the management device 302, the management device 302 stores the transmitted operation authority information. On this occasion, the management device 302 notifies occurrence of the change in operation authority information of the operation device 304, the management terminal device 306 (shown in FIG. 4), and so on if necessary. Subsequently, the management device 302 transmits (downloads) the operation authority information to another substrate processing apparatus 100B storing the operation authority information in which the same user as stored in the operation authority information set in the substrate processing apparatus 100A is stored. In this case, it is possible to transmit operation authority information of all of the users or to transmit the operation authority information of only the designated user. As described above, by transmitting the operation authority information from the management device 302 to another substrate processing apparatus 100 (the operation device 304) to which the same user as set in the substrate processing apparatus 100A is set, the consistency in the operation authority information among all of the substrate processing apparatuses 100 (the operation devices 304) connected to the communication line 308 can be maintained.

As described above, according to the embodiment of the present invention, there is eliminated a contradiction that in the management device 302, only data browsing is allowed but data editing is not allowed while on the side of the substrate processing apparatus 100, data editing is allowed, because the operation right set to each of the substrate processing apparatuses 100 and the operation right set to the management device 302 are different from each other, which is caused by the fact that setting of the operation right to the management device 302 and the setting of the operation authority to the substrate processing apparatus 100 are performed separately, and moreover, these operation authorities is not commoditized, and further it is also eliminated that the browsable data is different from the data the user intends to browse, thus the usability is improved.

Therefore, the present invention can easily set and change the operation authority information for each user to a plurality of substrate processing apparatuses 100 (the operation devices 304) and the management device 302 on the same screen. Further, the management system 300 of the present invention can easily be implemented to an existing system which has already been put into practice. Specifically, also in the case in which the management device 302 is implemented afterward to the existing system in which each of the substrate processing apparatuses 100 (operation devices 304) has the operation authority information different from those of other substrate processing apparatuses set thereto, it is possible that the management device 302 acquires the operation authority information of each of the substrate processing apparatuses 100 (the operation devices 304) and maintains the consistency in the operation authority information among all of the substrate processing apparatuses 100 (the operation devices 304). In particular, in the present invention, since the operation authority information in the management device 302 for each user and the operation authority information in the substrate processing apparatuses 100 (the operation devices 304) are shared, there is no chance to make the setting of the operation right to each of the functions different among the management device 302 and the substrate processing apparatuses 100 (the operation devices 304) against the will of the user. Therefore, accompanying unnecessary rests of the devices can be prevented.

It should be noted that in the present embodiment, in the case in which the operation device 304 and the substrate processing apparatus 100 are separated from each other, it can be arranged that the operation authority is set by the operation device 304 displaying an operation authority setting table 352 similar to that in the management device 302. Further, the present invention can be applied not only to the semiconductor manufacturing device but also to a device for processing a glass substrate such as an LCD device as the substrate processing apparatus. The process (a film forming process) inside the substrate processing device described above includes, for example, CVD, PVD, a process for forming an oxide film or a nitride film, and a process for forming a film including metal. Further, it can be an annealing process, an oxidation process, a nitriding process, or a diffusion process.

A preferred embodiment of the present invention will be described in addition.

In a substrate processing system including a plurality of substrate processing apparatuses for performing processing of a substrate, and a management device connected to the plurality of substrate processing apparatuses via a communication line, the management device has a screen used for setting operation authority information for each user to each of the management device and the plurality of substrate processing apparatuses capable of communicating with the management device, thereby the operation authority information for each user to the plurality of substrate processing apparatuses and the management device can easily be set and changed on the same screen.

Further, it is preferable that the available function and the operation right to the function are displayed on the screen for each user. Further, a section for setting the available function and the operation right to the function for each user is displayed on the screen, thus an erroneous setting hardly occurs.

Further, in a substrate processing system including a plurality of substrate processing apparatuses for performing processing of a substrate, and a management device connected to the plurality of substrate processing apparatuses via a communication line, the management device judges, in response to the operation authority information of the user being changed on an operation device in a predetermined substrate processing apparatus and the changed operation authority information being transmitted, whether or not there is a difference between the transmitted operation authority information and the operation authority information of another substrate processing apparatus set for the user, makes the operation device of the predetermined substrate processing apparatus display warning, updates the operation authority information set to the management device, and transmits the updated operation authority information to the another substrate processing apparatus if there is a difference to match the operation authority information for the user between the predetermined substrate processing apparatus and the another substrate processing apparatus, thereby consistency in the operation authority information among all of the substrate processing apparatuses can be maintained.

Further, in a substrate processing system including a plurality of substrate processing apparatuses for performing processing of a substrate, and a management device connected to the plurality of substrate processing apparatuses via a communication line, the management device judges, when performing a predetermined process, in response to the operation authority information of the user being changed on an operation device in a predetermined substrate processing apparatus and the changed operation authority information being transmitted, whether or not there is a difference between the transmitted operation authority information and the operation authority information of another substrate processing apparatus set for the user, makes an operation device of the predetermined substrate processing apparatus display warning, waits until the predetermined process is terminated if there is a difference, and stores the operation authority information relating to the user transmitted from the predetermined substrate processing apparatus when the predetermined process is terminated, thus even if different settings are provided respectively to the operation authority information in the management device and the operation authority information in the substrate processing apparatus, no influence is exerted by changing the operation authority information in the another substrate processing apparatus.

INDUSTRIAL APPLICABILITY

The present invention can be applied to a substrate processing system which is required to set the operation authority information for each user to a plurality of substrate processing apparatuses and a management device.

The invention claimed is:

1. A substrate processing system comprising:
a plurality of substrate processing apparatuses configured to perform processing of a substrate;
a communication line; and
a management device connected to the plurality of substrate processing apparatuses via the communication line, wherein
the management device has
a display section having a screen used for setting operation authority information indicative of what operation right is set to each user to each of the management device and the plurality of substrate processing apparatuses capable of communicating with the management device, and
the screen has
a function input section for setting each of the functions of the management device and the substrate processing apparatus,
a first authority input section for setting an operation right of the management device corresponding to each of the functions, and
a second authority input section for setting an operation right of the substrate processing apparatus corresponding to each of the functions, wherein
an operation authority information of a user on an operation device in a predetermined substrate processing apparatus among the plurality of substrate processing apparatuses is changed and the changed operation authority information is transmitted,
the management device judges whether or not there is a difference between the transmitted operation authority information and the operation authority information of another substrate processing apparatus set for the user; such that
if there is no difference between the transmitted operation authority information and the operation authority information of another substrate processing apparatus set for the user, the management device waits for the operation authority information to be transmitted,
if there is a difference between the transmitted operation authority information and the operation authority information of another substrate processing apparatus set for the user, the management device makes an operation device of the predetermined substrate processing apparatus display a warning;
the predetermined substrate processing apparatus, if the warning is canceled, transmits the operation authority information including the information of the result of the judgment whether or not being reflected to the another substrate processing apparatus, and
the management device stores the operation authority information relating to the user transmitted from the predetermined substrate processing apparatus and transmits the operation authority information to the another substrate processing apparatus according to the result of the judgment.

2. The substrate processing system according to claim 1, further comprising:
an ID input section, wherein
every time a user ID is changed by clicking the ID input section, an available function and an operation right to the function are displayed by switching on the screen for each user.

3. The substrate processing system according to claim 1, wherein
the screen that is displayed depends on who the user is.

4. A substrate processing system comprising:
a plurality of substrate processing apparatuses for performing processing of a substrate;
a communication line; and
a management device connected to the plurality of substrate processing apparatuses via the communication line, wherein
an operation authority information of a user on an operation device in a predetermined substrate processing apparatus among the plurality of substrate processing apparatuses is changed and the operation authority information is transmitted,
the management device judges whether or not there is a difference between the transmitted operation authority information and the operation authority information of another substrate processing apparatus set for the user, such that
if there is no difference between the transmitted operation authority information and the operation authority information of another substrate processing apparatus set for the user, the management device waits for the operation authority information transmitted,
if there is a difference between the transmitted operation authority information and the operation authority information of another substrate processing apparatus set for the user, the management device makes the operation device of the predetermined substrate processing apparatus display a warning, and, at the same time cancels the warning display, and waits for the operation authority information to be notified; and
the management device i) updates the operation authority information set to the notified operation authority information; and ii) judges whether or not the updated operation authority information is reflected to the another substrate processing apparatus; such that
if the updated operation authority information is not allowed to be reflected, the management device directly terminates the process without being reflected to the another substrate processing apparatus, and
if the updated operation authority information is allowed to be reflected, the management device downloads the updated operation authority information to the another substrate processing apparatus.

5. A substrate processing system comprising:
a plurality of substrate processing apparatuses configured to perform processing of a substrate;
a communication line; and
a management device connected to the plurality of substrate processing apparatuses via the communication line, wherein an operation authority information of a user on an operation device in a predetermined substrate processing apparatus among the plurality of substrate processing apparatuses is changed and the changed operation authority information is transmitted,
the management device judges whether or not there is a difference between the transmitted operation authority information and the operation authority information of another substrate processing apparatus set for the user; such that
if there is no difference between the transmitted operation authority information and the operation authority information of another substrate processing apparatus set for the user, the management device waits for the operation authority information to be transmitted,
if there is a difference between the transmitted operation authority information and the operation authority information of another substrate processing apparatus set for the user, the management device makes an operation device of the predetermined substrate processing apparatus display a warning;
the predetermined substrate processing apparatus, if the warning is canceled, transmits the operation authority information including the information of the result of the judgment whether or not being reflected to the another substrate processing apparatus, and
the management device stores the operation authority information relating to the user transmitted from the predetermined substrate processing apparatus and transmits the operation authority information to the another substrate processing apparatus according to the result of the judgment.

6. A management device connected to a plurality of substrate processing apparatuses configured to perform processing of a substrate via a communication line, the management device comprising:
a display section having a screen used configured to set operation authority information indicative of what operation right is set to each user, to each of the management device and the plurality of substrate processing apparatuses capable of communicating with the management device, wherein
the screen has
a function input section configured to set each of the functions of the management device and the substrate processing apparatus,
a first authority input section configured to set an operation right of the management device corresponding to each of the functions, and
a second authority input section for setting an operation right of the substrate processing apparatus corresponding to each of the functions, wherein
an operation authority information of a user on an operation device in a predetermined substrate processing apparatus among the plurality of substrate processing apparatuses is changed and the changed operation authority information is transmitted,
the management device judges whether or not there is a difference between the transmitted operation authority information and the operation authority information of another substrate processing apparatus set for the user; such that
if there is no difference between the transmitted operation authority information and the operation authority information of another substrate processing apparatus set for the user, the management device waits for the operation authority information to be transmitted, if there is a difference between the transmitted operation authority information and the operation authority information of another substrate processing apparatus set for the user, the management device makes an operation device of the predetermined substrate processing apparatus display a warning;

the predetermined substrate processing apparatus, if the warning is canceled, transmits the operation authority information including the information of the result of the judgment whether or not being reflected to the another substrate processing apparatus, and the management device stores the operation authority information relating to the user transmitted from the predetermined substrate processing apparatus and transmits the operation authority information to the another substrate processing apparatus according to the result of the judgment.

7. A display method of a management device connected to a plurality of substrate processing apparatuses for performing processing of a substrate via a communication line, the display method comprising:

displaying a function input section configured to set each of the functions of the management device and the substrate processing apparatus, setting an operation right of the management device corresponding to each of the functions, using a first authority input section;

setting an operation right of the substrate processing apparatus corresponding to each of the functions on the screen used for setting operation authority information indicative of what operation right is set to each user to each of the management device and the plurality of substrate processing apparatuses capable of communicating with the management device, using a second authority input section, changing an operation authority information of a user on an operation device in a predetermined substrate processing apparatus among the plurality of substrate processing apparatuses and transmitting the changed operation authority information, judging the management device to determine whether or not there is a difference between the transmitted operation authority information and the operation authority information of another substrate processing apparatus set for the user; such that if there is no difference between the transmitted operation authority information and the operation authority information of another substrate processing apparatus set for the user, the management device waiting for the operation authority information to be transmitted, if there is a difference between the transmitted operation authority information and the operation authority information of another substrate processing apparatus set for the user, the management device making an operation device of the predetermined substrate processing apparatus display a warning;

the predetermined substrate processing apparatus, if the warning is canceled, transmitting the operation authority information including the information of the result of the judgment whether or not being reflected to the another substrate processing apparatus, and the management device storing the operation authority information relating to the user transmitted from the predetermined substrate processing apparatus and transmitting the operation authority information to the another substrate processing apparatus according to the result of the judgment.

8. An updating method of an operation authority in a substrate processing system, the updating method comprising:

providing a plurality of substrate processing apparatuses configured to perform processing of a substrate and a management device connected to the plurality of substrate processing apparatuses via a communication line;

transmitting the changed operation authority information to the management device followed by changing an operation authority information of a user on an operation device in a predetermined substrate processing apparatus among the plurality of substrate processing apparatuses;

judging whether or not there is a difference between the transmitted operation authority information and the operation authority information of another substrate processing apparatus set for the user;

waiting for the operation authority information transmitted if there is no difference;

waiting for the operation device of the predetermined substrate processing apparatus to display a warning, and, at the same time the warning is canceled, notifying the operation authority information if there is a difference; and judging whether or not the updated operation authority information is reflected to the another substrate processing apparatus followed by updating the operation authority information set to the management device to the notified operation authority information, such that if it is not allowed to be reflected, the management device directly terminates the process without being reflected to the another substrate processing apparatus, and if it is allowed to be reflected, the management device downloads the updated operation authority information to the another substrate processing apparatus.

9. A setting-up method of a substrate processing system, the setting-up method comprising:

providing a plurality of substrate processing apparatuses configured to perform processing of a substrate and a management device connected to the plurality of substrate processing apparatuses via a communication line;

changing an operation authority information of a user on an operation device in a predetermined substrate processing apparatus among the plurality of substrate processing apparatuses by changing parameters relating to the device configuration during the setting-up;

transmitting the changed operation authority information;

judging whether or not there is a difference between the transmitted operation authority information and the operation authority information of another substrate processing apparatus set for the user;

displaying a warning on the operation device of the predetermined substrate processing apparatus if there is a difference;

restoring parameters relating to the device configuration after the setting-up;

transmitting the operation authority information again from the operation device of the predetermined substrate processing apparatus if the warning is canceled; and storing the transmitted operation authority information.

* * * * *